(12) United States Patent
Waddington

(10) Patent No.: US 8,719,786 B2
(45) Date of Patent: May 6, 2014

(54) METHOD FOR PERFORMING CONDITIONALIZED N-WAY MERGING OF SOURCE CODE

(75) Inventor: Daniel G. Waddington, Tinton Falls, NJ (US)

(73) Assignee: Alcatel Lucent, Paris (FR)

( * ) Notice: Subject to any disclaimer, the term of this patent is extended or adjusted under 35 U.S.C. 154(b) by 2360 days.

(21) Appl. No.: 11/093,517

(22) Filed: Mar. 30, 2005

(65) Prior Publication Data

US 2006/0225040 A1  Oct. 5, 2006

(51) Int. Cl.
*G06F 9/44* (2006.01)

(52) U.S. Cl.
USPC .......................................... 717/122

(58) Field of Classification Search
CPC ........................................... G06F 8/71
USPC ........................................... 717/122
See application file for complete search history.

(56) References Cited

U.S. PATENT DOCUMENTS

| | | | | |
|---|---|---|---|---|
| 5,481,777 | A * | 1/1996 | Nenninger | 15/151 |
| 5,649,200 | A * | 7/1997 | Leblang et al. | 717/122 |
| 5,715,454 | A * | 2/1998 | Smith | 707/690 |
| 5,946,488 | A | 8/1999 | Tanguay et al. | |
| 6,029,002 | A | 2/2000 | Afifi et al. | |
| 6,149,318 | A | 11/2000 | Chase et al. | |
| 6,415,299 | B1 * | 7/2002 | Baisley et al. | 707/999.101 |
| 6,427,228 | B1 | 7/2002 | Wigger | |
| 6,542,906 | B2 * | 4/2003 | Korn | 707/203 |
| 6,668,325 | B1 | 12/2003 | Colberg et al. | |
| 7,089,270 | B2 * | 8/2006 | Ren et al. | 707/695 |
| 7,117,488 | B1 | 10/2006 | Franz et al. | |
| 7,131,112 | B1 * | 10/2006 | Bartz et al. | 717/122 |
| 7,228,529 | B2 * | 6/2007 | Bera | 717/137 |
| 7,263,531 | B2 * | 8/2007 | Venkatesan et al. | 707/999.102 |
| 7,805,714 | B2 | 9/2010 | Waddington et al. | |
| 2002/0059469 | A1 | 5/2002 | Gray et al. | |
| 2003/0084424 | A1 * | 5/2003 | Reddy et al. | 717/105 |
| 2003/0149689 | A1 | 8/2003 | Chow et al. | |
| 2003/0182572 | A1 | 9/2003 | Cowan et al. | |
| 2004/0230886 | A1 * | 11/2004 | Livshits | 715/500 |
| 2005/0039173 | A1 | 2/2005 | Tondreau et al. | |
| 2005/0251533 | A1 | 11/2005 | Harken et al. | |
| 2006/0106889 | A1 * | 5/2006 | Mannby | 707/203 |
| 2006/0117075 | A1 * | 6/2006 | Cowan et al. | 707/203 |
| 2006/0212859 | A1 | 9/2006 | Parker et al. | |
| 2007/0016629 | A1 * | 1/2007 | Reinsch | 707/203 |
| 2007/0157173 | A1 * | 7/2007 | Klein et al. | 717/122 |

OTHER PUBLICATIONS

"Configuration Management with Version Sets", Andreas Zeller, Apr. 1997, Technische Universitat Braunschweig.*

"Syntactic Software Merging", Jim Buffenbarger, Boise State University.*

(Continued)

*Primary Examiner* — Wei Zhen
*Assistant Examiner* — Junchun Wu
(74) *Attorney, Agent, or Firm* — Wall & Tong, LLP

(57) ABSTRACT

A method combines N versions of a C/C++ program into a single, semantically correct, unified program, while maintaining the semantics of each version within N. The problem of merge conflicts is avoided by conditionalizing changes that potentially conflict, according to a set of preprocessors definitions that uniquely define the version within N. Conditionalization is realized through C/C++ preprocessing directives (e.g., #if, #else, #elif).

17 Claims, 5 Drawing Sheets

(56) References Cited

OTHER PUBLICATIONS

Mehra et al. "A Generic Approach to Supporting Diagram Differencing and Merging for Collaborative Design", Nov. 2005, ACM.*
Conradi et al. "Version Models for Software Configuration Management", Jun. 1998, ACM.*
Burns et al. "In-Place Reconstruction of Version Differences", Jul./Aug. 2003, vol. 15 No. 4, IEEE.*
Hunt et al. "Delta Algorithms: An Empirical Analysis", Apr. 1998, vol. 7 No. 2, pp. 192-214, ACM.*
"Rational ClearCase, Developing Software, Windows Edition," Version 2002.05.00 and later, Rational Software Corporation, Section 5.3, pp. 69-81.
"Version Management with CVS," for CVS 1.11.18, Per Cederqvist et al., 2004, Sections 10.2 and 10.3, pp. 64-67.
GNU Tools, manual entry for diff3, pp. 1-2.
GNU Tools, manual entry for diff, pp. 1-4.
J. W. Hunt and M. D. McIlroy, "An Algorithm for Differential File Comparison," Technical Report #41, Computing Science, Bell Laboratories, 1976.
Mario Latendresse, "Fast Symbolic Evaluation of C/C++ Preprocessing Using Conditional Values," Proceedings of the Seventh European Conference on Software Maintenance and Reengineering (CSMR'03), IEEE 2003.
A. Malton et al., "Processing Software Source Text in Automated Design Recovery and Transformation," Proc. IWPC 2001, IEEE $9^{th}$ International Workshop on Program Comprehension, Toronto, May 2001, pp. 127-134.
I. D. Baxter and M. Mehlich, "Preprocessor Conditional Removal by Simple Partial Evaluation," Proceedings Eighth Working Conference on Reverse Engineering, Oct. 2001, pp. 281-290.
L. Aversano, "Handling Preprocessor-Conditioned Declarations," Proceedings Second IEEE International Workshop on Source Code Analysis and Manipulation, Oct. 2002, pp. 83-92.
A. Garrido and R. Johnson, "Refactoring C With Conditional Compilation," $18^{th}$ IEEE International Conference on Automated Software Engineering (ASE 2003), Montreal, Canada 2003, pp. 323-326.
M. Vittek, "Refactoring Browser With Preprocessor," Proceedings of $7^{th}$ European Conference on Software Maintenance and Reengineering, Mar. 2003, pp. 101-1.
I. D. Baxter et al, "DMS: Program Transformations for Practical Scalable Software Evolution", Proceedings, International Conference of Software Enginering, May 2004.
A. Garrido and R. Johnson, "Handling Preprocessor Macros in Refactoring," ACM SIGPLAN Conference on Programming Language Design and Implementation, 2004.
Burson et al., "A Program Transformation Approach to Automated Software Re-Engineering," 1990, IEEE, pp. 314-322.
Garrido et al., Challenges of Refactoring C Programs, 2003, ACM.
J.R. Cordy et al., "The TXL Programming Language," Version 10.4, Software Technology Laboratory, School of Computing, Queen's University at Kingston, Kingston, Ontario, Canada, Jan. 2005.

\* cited by examiner

METHOD FOR PERFORMING CONDITIONALIZED N-WAY MERGING OF SOURCE CODE

CROSS-REFERENCES

The present application is related to copending applications "A Method for Handling Preprocessing in Source Code Transformation", U.S. application Ser. No. 11/093,530 and "Technique for Constructing Syntax-Directed Search and Modifications in Program Transformation Systems", U.S. application Ser. No. 11/093,518, which were filed on the same date as the present application. These copending applications are incorporated herein by reference in their entireties.

FIELD OF THE INVENTION

The present invention relates generally to the field of programming languages and program source code management and, in particular, relates to N-way merging of source code into a single, unified and semantically correct version.

BACKGROUND OF THE INVENTION

There is a need for a way to create a single, unified, semantically correct source code program given N parallel versions. Such parallelism typical stems from multi-user development environments whereby individual changes are made by separate bodies or organizations. For example, in collaborative software development, multiple developers may edit a single file concurrently, resulting in multiple potentially conflicting versions of that file. Another example is software development for multiple platforms.

Many code versioning systems that exist today perform only bi-way merges; N-way merging is realized as multiple bi-way merges. However, this approach suffers from the problem of merge conflicts. Conflicts are caused when there are dissimilar changes to the same line(s) of source code in more than one instance in the N-way merge. Consider a 3-way merge of programs O (original), A and B. If both versions A and B contain different changes (addition/deletion/modification) to one or more identical lines, then a conflict occurs. For example:

| Code O: | Code A: | Code B: | |
|---------|---------|---------|---|
| A | A | A | |
| B | X | Y | <-- conflict occurs. |
| C | C | C | |
| D | D | D | |

Traditionally, conflicts of this nature are handled manually by the developer, typically by editing any special annotations in the code indicating that a conflict has occurred.

SUMMARY

Various deficiencies of the prior art are addressed by the present invention of a method for performing conditionalized N-way merging of source code.

One aspect is a method for performing conditionalized N-way merging of source code. Differential information for each of N versions of an original source code program is collected. The original source code program has lines of text. A merge data structure is constructed from the differential information. The N versions are merged into a single, semantically correct, unified program using the merge data structure. The single, semantically correct, unified program uses preprocessing conditionals to capture the differences between the N versions. Another aspect is a computer-readable medium having instructions stored thereon for performing this method.

Yet another aspect is a system for performing conditionalized N-way merging of source code, including a differential collection component, a constructor, and a merge component. The differential collection component collects differential information for each of N versions of an original source code program. The constructor constructs a merge data structure from the differential information. The merge component merges the N versions into a single, semantically correct, unified program using the merge data structure.

BRIEF DESCRIPTION OF THE DRAWINGS

The teachings of the present invention can be readily understood by considering the following detailed description in conjunction with the accompanying drawings, in which.

DETAILED DESCRIPTION OF THE INVENTION

The invention will be primarily described within the context of a method for performing conditionalized N-way merging of C/C++ source code. However, those skilled in the art and informed by the teachings herein will realize that the invention is also applicable to any form of high or low level source code that supports branch/versioning constructs, concurrent source code version control, source code transformation, meta-processing, automated transformation tools, preprocessors, postprocessors, manually performed steps, partially automated and partially interactive or manual steps, instructions in software or firmware components storable in the memory of and executable on many different kinds of computing machines, such as a personal computer (PC) with an operating system, such as Linux, application program interfaces (APIs), debugging, profiling, software porting, software executable on multiple platforms, prototyping, software environments, and many other different kinds of applications.

An exemplary method allows N versions of a C/C++ program to be merged, while maintaining the semantics of each version within N. This exemplary method avoids the problem of merge conflicts by conditionalizing changes that potentially conflict, according to a set of preprocessors definitions that uniquely define the version within the N versions. Conditionalization is realized through C/C++ preprocessing directives (e.g., #if, #else, #elif). For example, given the previous example of merging source programs, O, A and B, the conditionalized merge may be given (assuming that versions A and B are defined by preprocessing definition sets {A} and {B} respectively):

```
                // merged version
                A
                #if defined(A)
                X
                #elif defined(B)
                Y
                #else
                B
                #endif
                C
                D
```

This exemplary merging method includes collecting differential information from a given original source code program to N modified versions of the original source code program. This differential information is collected using the standard UNIX diff tool and unified into a single differential representation. Given the command "diff original-file modified-file>diff-file", the standard UNIX diff utility takes two files and defines the differential in terms of one or more of the following hunks (a hunk being a block of data).

add (i,r)—insert at position i of the original file, lines in range r of the diff file.

delete (r, i)—delete lines in range r from the original file; they would have appeared at line i of the modified file.

change (f,t)—replace lines in range f of the original file with lines in range t of the modified file.

Figure 1:
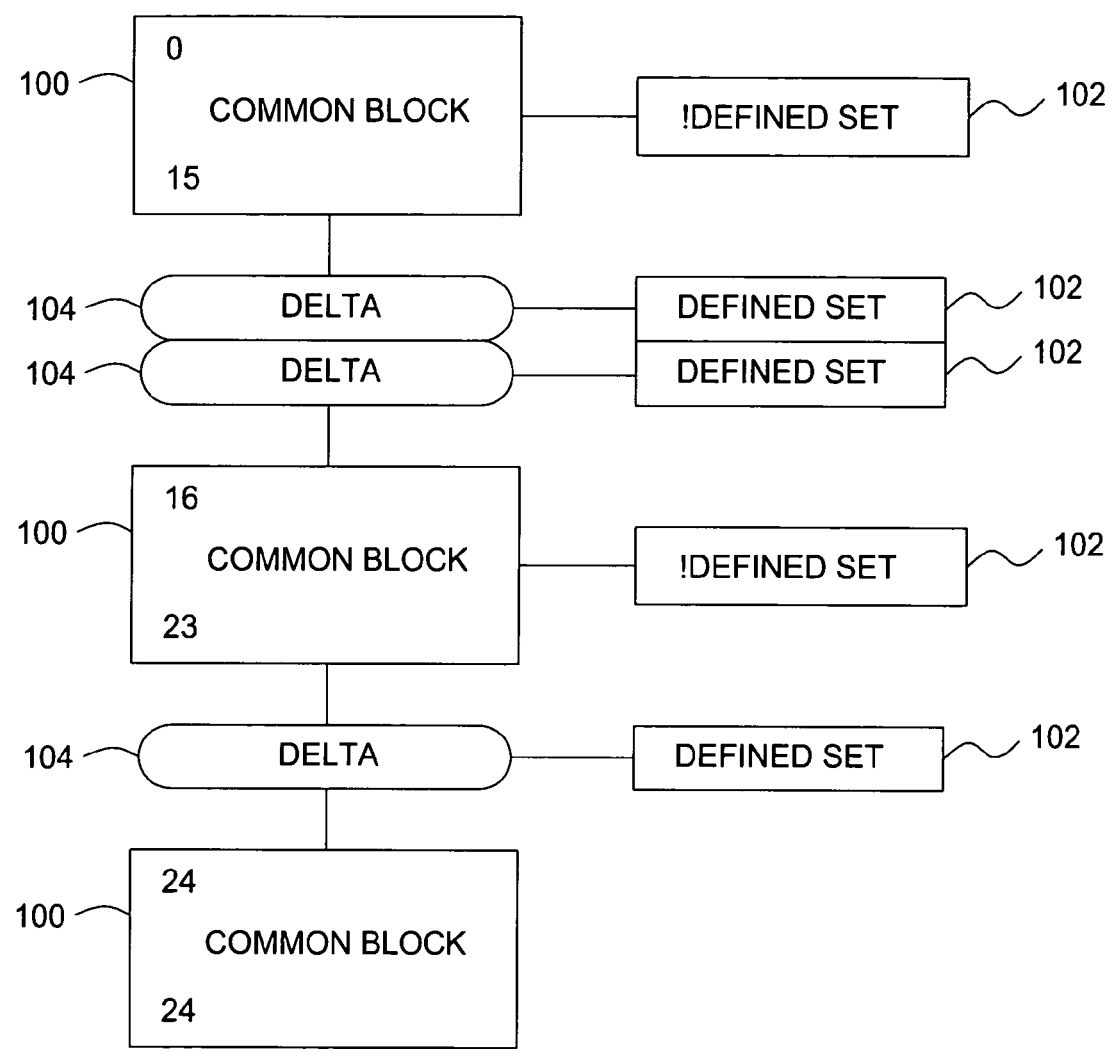
FIG. 1 shows an exemplary abstraction of a merge data structure.

FIG. 1 shows an exemplary abstraction of a unified merge data structure, which is constructed by this exemplary method using the differential information previously described. This exemplary embodiment of the unified merge data structure is a linked list of common blocks 100. However, other embodiments maybe implemented any combination of data structure(s), file(s), or storage element(s). Each common block 100 defines a sequence of textual lines and integral ranges; each range is inclusive. A common block 100 can have no lines, in which case the range start is identical to the range end. Common blocks 100 represent source text that exists in the original source file. Associated with each common block 100 is a set of exclusionary definitions known as defined or not defined sets 102. A define set is a set of symbols that hold true (i.e., exist) for a given version of the source code. Consider the following example:

| Define Sets | Code O: {X} | Code A: {X,Y} | Code B: {X,Z} |        |
|-------------|-------------|---------------|---------------|--------|
|             | A           | A             | A             | line 1 |
|             | B           | X             | Y             | line 2 |
|             | C           | C             | C             | line 3 |
|             | D           | D             | D             | line 4 |

This example produces the following three common blocks 100, which are herein described using a textual representation of the merge data structure of this form.

| 0, 1 | A |                            |
|------|---|----------------------------|
| 2, 2 | B | not defined {empty}        |
| 3, 4 | C | not defined {{X,Y}, {X,Z}} |
|      | D | not defined {empty}        |

A not defined set 102 associated with a particular common block is a set of sets that identify code versions that do not include that common block. In the above example, the first common block that contains lines 0 to 1 is included by all the versions; thus, the not defined set is {empty}. The second common block containing line 2 is included only by Code O and not included by Code A or Code B. Thus, the define sets for Code A and Code B, i.e., {X,Y} and {X,Z} are in the not defined set for the second common block. The third common block containing lines 3 and 4 is included by all the versions; thus, the not defined set is {empty}.

Associated with each common block 100 is a list of zero or more deltas 104. Deltas 104 represent blocks of code that have been added by one or more of the modified N versions. The position of the additional source text is determined by the last line in the range of the common block 100 to which it is attached. Each delta 104 defines a set of define sets for which the delta 104 should be included (inclusion set). Given the previous example, the following deltas 104 are defined, where CB denotes common block.

attached to CB(2,2)→X defined {{X,Y}}
attached to CB(2,2)→Y defined {{X,Z}}

Basic Construction Method

Figure 2:
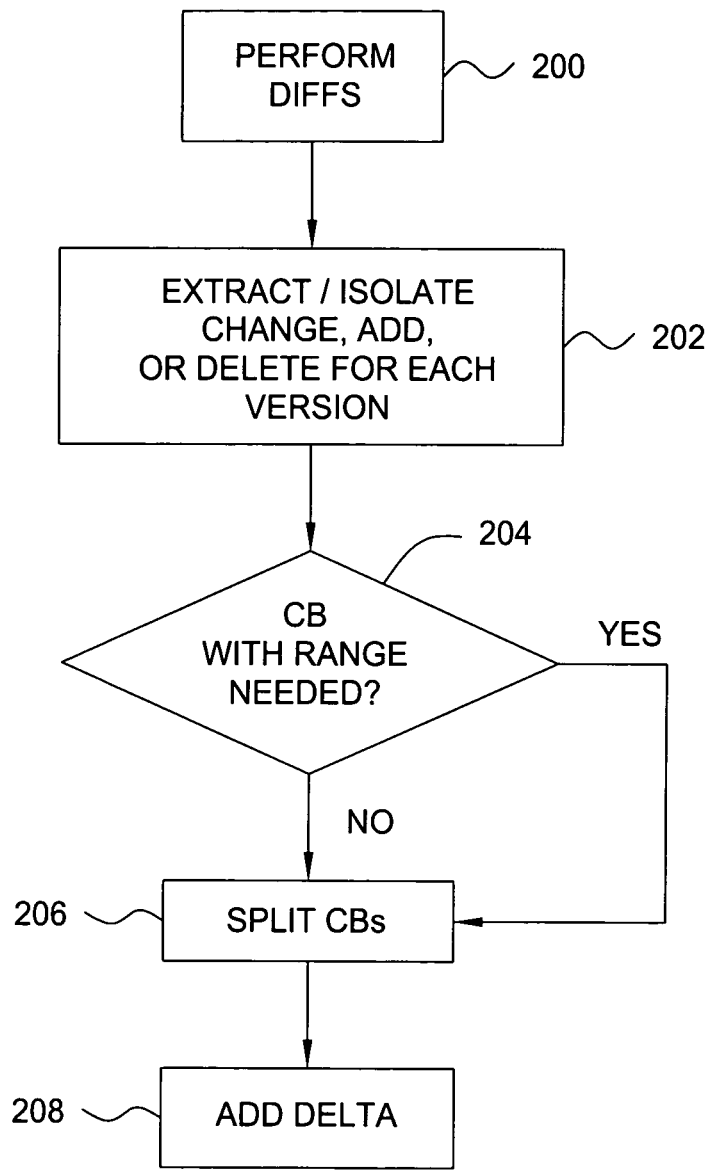
FIG. 2 is a flow chart showing an exemplary method of constructing a merge data structure for N versions of source code.

FIG. 2 illustrates an exemplary method of constructing a merge data structure for N versions of source code. Diffs are performed at 200. For each version, detail of any change, addition, or deletion is extracted at 202. It is determined whether a common block exists having the range needed at 204. If necessary, common blocks are split at 206 in order to create appropriate reference points for the new deltas. Deltas are added at 208.

As illustrated in FIG. 2, the merge data structure is constructed from a series of common block 100 splits and delta 104 creations. In this example, a change is processed. Similar processing occurs for additions and deletions, because a change is in effect a combination of addition and deletion. The initial form of the merge data structure is a single common block 100 representing an original file. For our previous example, this is given as:

| 0, 4 | A |                     |
|------|---|---------------------|
|      | B |                     |
|      | C |                     |
|      | D | not defined {empty} |

Diffs are performed between the original and each of the N modified versions. As each diff is performed, the differential information is introduced into the merge data structure. The differential hunks (as reported by the UNIX diff tool) for our previous example are given as:

| 1.) diff O and A => change(2, 2) | <B |
|----------------------------------|----|
|                                  | —  |
|                                  | >X |
| 2.) diff O and B => change(2, 2) | <B |
|                                  | —  |
|                                  | >Y |

A change(2,2) is interpreted as an exclusion from original lines in range 2,2 (i.e., a single line) and inclusion of the new line. To realize the exclusion, there must exist a common block 100 that represents the exact range 2,2. If there does not exist such a common block 100, then the common blocks 100 must be split accordingly. In this example, the result of the spit is given as:

| CB(0, 1) | A | not defined {empty} |
|----------|---|---------------------|
| CB(2, 2) | B | not defined {empty} |
| CB(3, 4) | C | |
|          | D | not defined {empty} |

Thus, CB(2,2) can now be excluded for the respective set.

| CB(0, 1) | A | not defined {empty} |
|----------|---|---------------------|
| CB(2, 2) | B | not defined {{X,Y}} |
| CB(3, 4) | C | |
|          | D | not defined {empty} |

To effectuate the new lines of source code, a delta 104 is introduced and attached to CB(2,2).

| CB(0, 1) | A | not defined {empty} |
|----------|---|---------------------|
| CB(2, 2) | B | not defined {{X,Y}} |
| --> |  | delta X {{X,Y}} |
| CB(3, 4) | C | |
|          | D | not defined {empty} |

The differential change(2,2) from the second diff of N, is incorporated in a similar manner. At this point however, there is no need to further split the common blocks 100 since CB(2,2) already exists. However, the define sets 102 for source B must be added to the exclusion set as follows:

| CB(0, 1) | A | not defined {empty} |
|----------|---|---------------------|
| CB(2, 2) | B | not defined {{X,Y}, {X,Z}} |
| --> |  | delta X {{X,Y}} |
| CB(3, 4) | C | |
|          | D | not defined {empty} |

Figure 3:
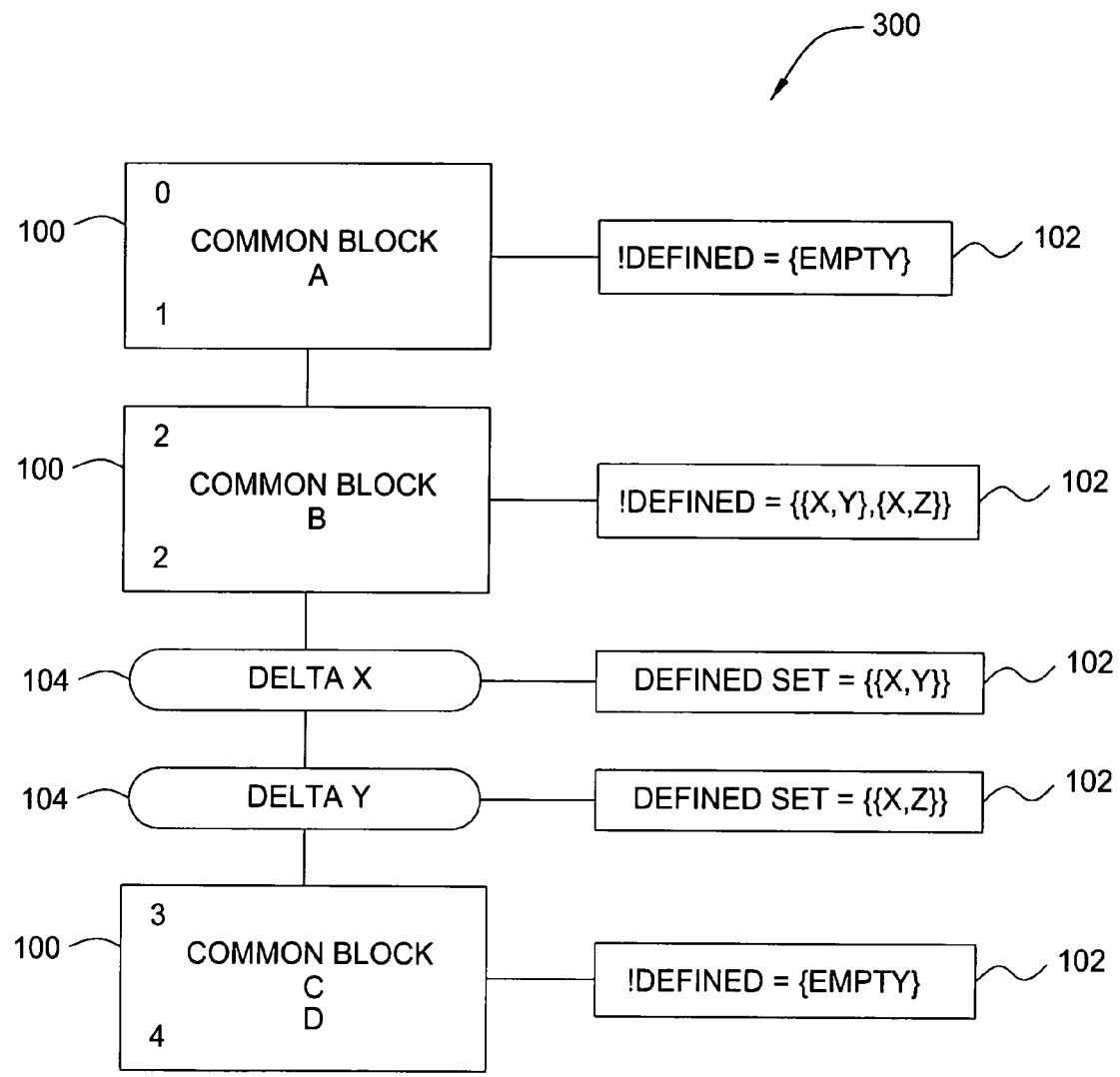
FIG. 3 is another exemplary merge data structure.

And then the delta 104 is added giving the final merge data structure 300, as shown in FIG. 3.

| CB(0, 1) | A | not defined {empty} |
|----------|---|---------------------|
| CB(2, 2) | B | not defined {{X,Y}, {X, Z}} |
| --> |  | delta X {{X,Y}} |
| --> |  | delta Y {{X, Z}} |
| CB(3, 4) | C | |
|          | D | not defined {empty} |

When a common block 100 is split, the not defined set 102 is copied to the common block that retains the lower part of the range. Deltas 104 attached to a common block 100 are associated with the last line specified in the common block 100 range. Consider splitting the following CB for an exclusion of 2,3.
CB(0,10)—delta1,delta2
Split becomes:
CB(0,1), CB(2,3), CB(4,10)—delta1,delta2
After all N diffs have been performed, and their differentials introduced into the merge data structure, the next phase of the process is to construct from the merge data structure, a unified version of the program text. In this exemplary embodiment, there are two modes of operation for the merge process. The first retains a copy of the original source code in the unified version, while the second does not.

Figure 4:
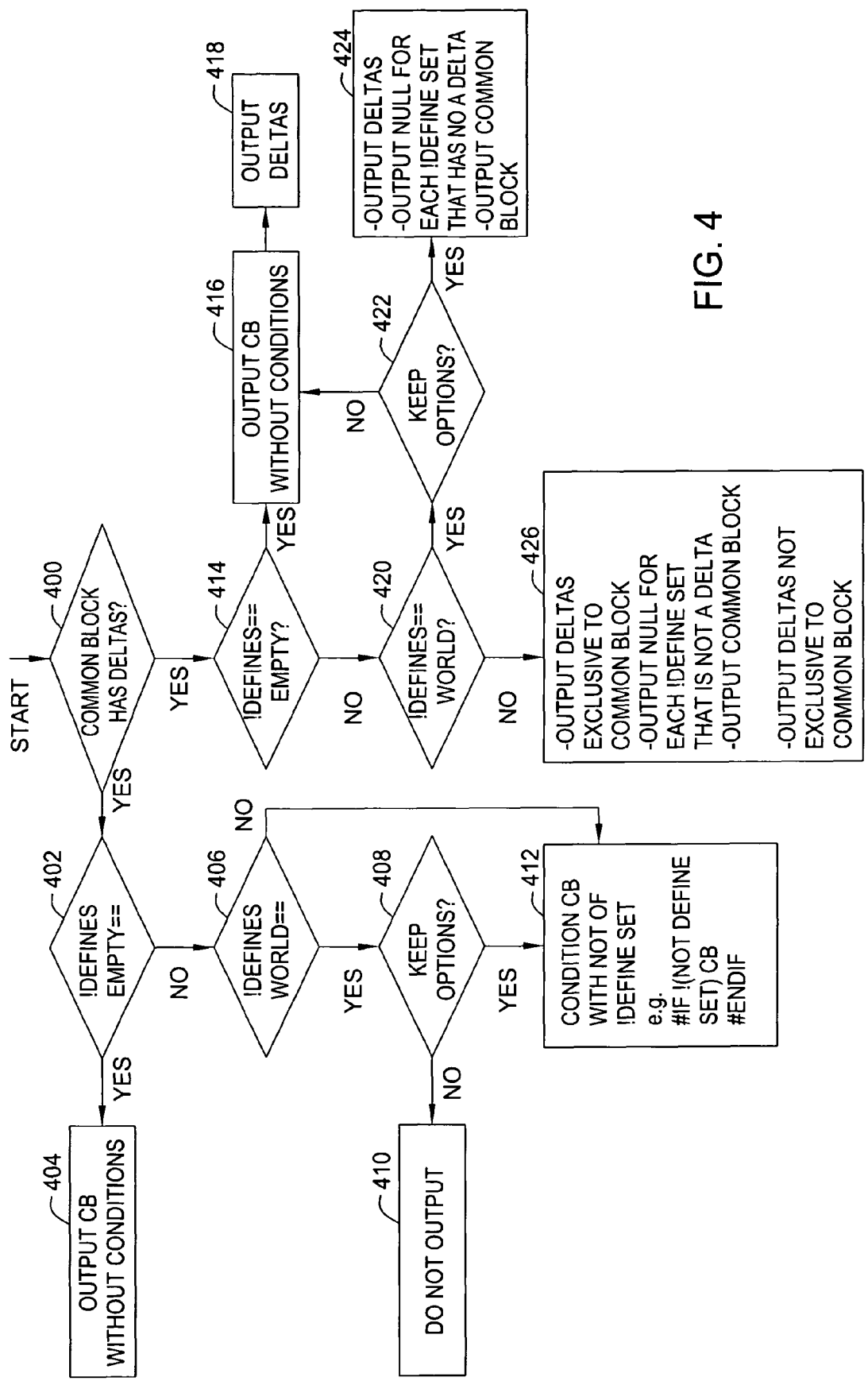
FIG. 4 is a flow chart showing a method of source construction.

FIG. 4 shows a method of source construction, which is iterated for each common block to create a merged version that is conditionalized. For the current common block, the method starts by determining whether the current common block has any deltas at 400. If there are no deltas, then it is determined whether the not defined set is empty at 402. If the not defined set is empty (i.e., all N versions include the current common block) and the common block is output without any conditions at 404. Otherwise, if the not defined set is not empty at 402, then it is determined whether the not defined set is equal to the world (i.e., no versions include the current common block; in other words, all N versions delete the current common block) at 406. If the not defined set is equal to the world at 406, then it is determined whether to keep a copy of the original source code in the merged version at 408. If the original source code is not being kept at 408, then the current common block is not output at 410. If the not defined set is not equal to the world at 406 or the original source code is being kept at 408, then the current common block is output with the appropriate conditions at 412.

Returning to the determination of whether the common block has deltas at 400 in FIG. 4, if the common block does have deltas, then it is determined whether the not defined set is empty (i.e., all N versions exclude this piece of original code) at 414. If the not defined set is empty at 414, then the current common block is output without conditions at 416 and deltas are output at 418. If the not defined has members (i.e., some of the N versions exclude the original code) at 414, then it is determined whether the not defined set is equal to the world (i.e., no versions include the delta) at 420. If the not defined set is equal to the world at 420, then it is determined whether to keep a copy of the original source code in the merged version at 422. If the original source code is not being kept at 422, then the current common block is output without conditions at 416 and deltas are output at 418. Otherwise, if the original source code is being kept at 422, then the deltas are output, null is output for each not define set that is not a delta (i.e., for each pure deletion), and the current common block is output at 424. If the not defined set is not equal to the world at 420, then the deltas that are exclusive to the current common block are output, null is output for each not define set that is not a delta, the current common block is output, and deltas that are not exclusive to the current common block are output at 426.

Clause Derivation

In this exemplary method, constructing the merged version involves writing out the source text held in common blocks and delta blocks with the appropriate C/C++ preprocessing conditionals to reflect the captured inclusion and exclusion sets. We define a clause as a condition which if held true, uniquely identifies a particular define set. For example, given define sets {A}, {B} and {C}, the clauses are derived as defined(A), defined(B) and defined(C) respectively. However, clause derivation in the presence of overlapping define sets is more complex. Here is a formal definition:
$\forall D(D \subseteq U)$ the condition $\Phi$ of define set D, $$\Phi(D) = \pi(D) \wedge \rho(X_1) \wedge \rho(X_2) \ldots \wedge \rho(X_N): X_N \supset D$$

The inclusion clause, $\pi(D)$ is given $$\pi(D) = a_1 \wedge a_2 \ldots a_n: D = \{a_1, a_2 \ldots\}$$

The exclusion clause $$\rho_D(X) = \neg b_1 \wedge \neg b_2 \ldots \neg b_n: \{b_1, b_2 \ldots b_n\} = X - D$$

For example, given define sets {A,B} and {C}, the condition for set {A,B} is given:
defined(A) && defined(B)
Given define sets {A,B}, {A,B,C} and {D} the condition for set {A,B} is given: defined(A) && defined(B) && !defined(C)
Given define sets {A,B}, {A,B,C} and {A,B,D}, the condition for set {A,B} is given: defined(A) && defined(B) && !defined(C) && !defined(D)
Reconsidering the previous example:

| | | |
|---|---|---|
| CB(0, 1) | A | not defined {empty} |
| CB(2, 2) | B | not defined {{X, Y}, {X, Z}} |
| | --> | delta X {{X, Y}} |
| | --> | delta Y {{X, Z}} |
| CB(3, 4) | C | |
| | D | not defined {empty} |

The condition for delta X is given:
(defined(X) && defined(Y))
The condition for delta Y is given:
(defined(X) && defined(Z))
The final conditionalized code is given as follows:

```
A
#if (defined(X) && defined(Y))
X
#elif (defined(X) && defined(Z))
Y
#endif
C
D
```

Combining Clauses

Deltas that are common across one of the N modified versions, can be combined into a single delta and, hence, their respective clauses can also be combined.
Let us consider an extension of our example:

| Define Sets | Code O: {X} | Code A: {X, Y} | Code B: {X, Z} | Code C: {W} | |
|---|---|---|---|---|---|
| | A | A | A | A | 1 |
| | B | X | Y | Y | 2 |
| | C | C | C | C | 3 |
| | D | D | D | D | 4 |

The changes in made in modified versions B and C are identical. Thus, the delta introduced by them can be combined with a "logical OR" given as:

| | | |
|---|---|---|
| CB(0, 1) | A | not defined {empty} |
| CB(2, 2) | B | not defined {{X, Y}, {X, Z}} |
| | --> | delta X {{X, Y}} |
| | --> | delta Y {{X, Z} || {W}} |
| CB(3, 4) | C | |
| | | D not defined {empty} |

Thus, the merged result now becomes:

```
A
#if (defined(X) && defined(Y))
X
#elif (defined(X) && defined(Z)) || (defined(W))
Y
#endif
C
D
```

Code Removal

Code modifications also include removal of lines from the original. This exemplary embodiment handles code removal using the common block exclusion set. For example, take the following merge where modified version A removes the second line of code from the original.

| Define Sets | Code O: {X} | Code A: {X, Y} | |
|---|---|---|---|
| | A | A | 1 |
| | B | | 2 |
| | C | C | 3 |
| | D | D | 4 |

The merge data structure for this is:

| | | |
|---|---|---|
| CB(0, 1) | A | not defined {empty} |
| CB(2, 2) | B | not defined {{X, Y}} |
| CB(3, 4) | C | |
| | D | not defined {empty} |

The generated code is:

```
A
#if !(defined(X) && defined(Y))
B
#endif
C
D
```

The exclusion is realized through the not operator (!) on the clause.

Retention of the Original

The examples given up until now have assumed that the original version of the source code is not being retained. Consider the previous simple example:

| Define Sets | Code O: {X} | Code A: {X, Y} | Code B: {X, Z} | |
|---|---|---|---|---|
| | A | A | A | 1 |
| | B | X | Y | 2 |
| | C | C | C | 3 |
| | D | D | D | 4 |
| | E | F | F | 5 |

If the merging method is performed without keeping the original, the following code results:

```
A
#if (defined(X) && defined(Y))
X
#elif (defined(X) && defined(Z))
```

```
Y
#endif
C
D
F
```

Notice here that the line containing "B" does not appear in the final outcome, and that is because the changes to line 5 are consistent across all N modified versions; there is no conditional clause around F.

In some exemplary embodiments, the merge is executed with the keep option so that the merge data structure is transformed into conditionalized code and the original code is appended in the form of an else clause. (See FIG. 2.) This also means that F is conditionalized as follows:

```
A
#if (defined(X) && defined(Y))
X
#elif (defined(X) && defined(Z))
Y
#else
B
#endif
C
D
#if(defined(X) && defined(Y)) || (defined(X) && defined(Z))
F
#else
E
#endif
```

The previously described embodiments of the present invention have many advantages, such as the fact that parallel modifications of C and C++ source code are merged into a unified version that is semantically correct due to appropriately placed logical conditions. By contrast, conventional methods only perform 2-way merges with C/C++ conditionalization. The UNIX diff utility supports an option (—ifdef) that forces the diff to put conditions around differentials. For example:

| Define Sets | Code O: {X} | Code A: {Y} | |
|---|---|---|---|
| | A | A | 1 |
| | B | X | 2 |
| | C | C | 3 |
| | D | D | 4 |

The UNIX command 'diff —ifdef=A O A' results in:

```
A
#ifndef X
B
#else /* X */
X
#endif /* ! X */
C
D
E
```

First, UNIX diff does not support multiple defines for a given version of N. This limitation is due to the use of the #ifdef directive as opposed to the #if directive. We have changed the define sets in the examples to singletons. In addition, the diff utility's support for conditionalization is limited to a two file merge. Repeating the two-way merge for each of the N versions results in complex nested logic. An N-way merge using the existing diff utility will produce N levels of logic nesting.

Consider a three way merge performed as two independent diffs.

| Define Sets | Code O: {X} | Code A: {Y} | Code B: {Z} | |
|---|---|---|---|---|
| | A | A | A | 1 |
| | B | X | Y | 2 |
| | C | C | C | 3 |
| | D | D | D | 4 |

Results in:

```
A
#ifndef Z
#ifndef Y
B
#else /* Y */
X
#endif /* Y */
#else /* Z */
Y
#endif /* Z */
C
D
E
```

Furthermore, certain merge combinations result in semantically incorrect logic. Take the following example.

| Define Sets | Code O: {X} | Code A: {Y} | Code B: {Z} | |
|---|---|---|---|---|
| | A | A | A | 1 |
| | B | X | X | 2 |
| | C | C | C | 3 |
| | D | D | D | 4 |

Merge O→A gives (which we will call K):

```
A
#ifndef Y
B
#else /* Y */
X
#endif /* Y */
C
D
```

Merge K->B gives:
```
A
#ifndef Z
#ifndef Y
B
#else /* Y */
#endif /* ! Z */
X
#ifndef Z
#endif /* Y */
#endif /* ! Z */
C
D
```

To check the clause, we can put the merged version back through a C preprocessor. The above conditions are in fact incorrect. Evaluation with Z yields the following incorrect result:

A
B
C
D

This problem arises from the sequential nature of the differentials and the use of naive conditional nesting which effectively means that of modified version N1, N2, Nx N2 cannot exist without N1.

Figure 5:
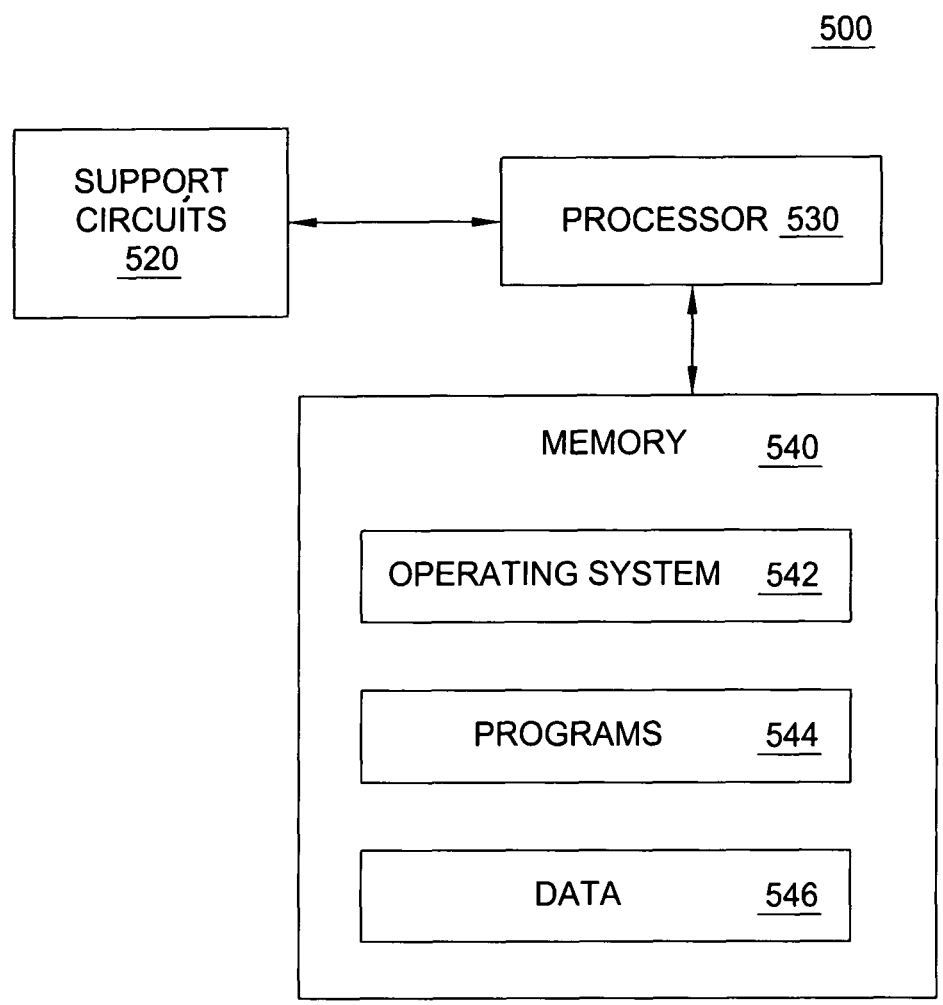
FIG. 5 is a high level block diagram showing a computer. To facilitate understanding, identical reference numerals have been used, where possible, to designate identical elements that are common to the figures.

FIG. 5 is a high level block diagram showing a computer. The computer 500 may be employed to implement embodiments of the present invention. The computer 500 comprises a processor 530 as well as memory 540 for storing various programs 544 and data 546. The memory 540 may also store an operating system 542 supporting the programs 544.

The processor 530 cooperates with conventional support circuitry such as power supplies, clock circuits, cache memory and the like as well as circuits that assist in executing the software routines stored in the memory 540. As such, it is contemplated that some of the steps discussed herein as software methods may be implemented within hardware, for example, as circuitry that cooperates with the processor 530 to perform various method steps. The computer 500 also contains input/output (I/O) circuitry that forms an interface between the various functional elements communicating with the computer 500.

Although the computer 500 is depicted as a general purpose computer that is programmed to perform various functions in accordance with the present invention, the invention can be implemented in hardware as, for example, an application specific integrated circuit (ASCI) or field programmable gate array (FPGA). As such, the process steps described herein are intended to be broadly interpreted as being equivalently performed by software, hardware, or a combination thereof.

The present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast media or other signal bearing medium, and/or stored within a working memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method for performing conditionalized N-way merging of source code associated with a program, comprising:
    collecting differential information for each of N versions of source code, the source code having lines of text;
    constructing a merge data structure using the differential information, the merge data structure comprising a plurality of common blocks and delta blocks, wherein each common block defines a respective sequence of textual lines of source code, each delta block defines an addition or deletion or change to a corresponding common block, each common block and delta block being associated with a respective set of exclusionary definitions indicative of any source code versions not including the respective block; and
    merging the N versions into a single, semantically correct, unified version of source code associated with the program using the merge data structure, the single, semantically correct, unified version of source code associated with the program having preprocessing conditionals adapted to identify differences between the N versions.

2. The method of claim 1, wherein the differential information includes pairwise diffs between each version and the original source code program.

3. The method of claim 1, wherein the constructing the merge data structure comprises:
    processing each difference in the differential information by selectively splitting common blocks, selectively adding deltas, and associating sets of versions to each common block and each delta.

4. The method of claim 1, wherein the merging the N versions into the single, semantically correct, unified program comprises:
    writing out the textual lines in each common block and each associated delta along with preprocessing conditionals to reflect the sets of versions associated with each common block and each delta.

5. The method of claim 4, wherein one of the N versions is the original source code program.

6. The method of claim 1, wherein each common block comprises textual lines within a respective range of textual lines of an original version of the source code.

7. The method of claim one, wherein one or more of said common blocks comprise textual lines included in each of the N versions of the source code.

8. The method of claim one, wherein said step of constructing said merge data structure comprises splitting an initial common block representing the original version of the source code into said plurality of common blocks by splitting said initial common block into common blocks comprising textual lines included in each of the N versions of the source code and common blocks comprising textual lines included in only some of the N versions of the source code.

9. The method of claim 8, wherein said splitting of said initial common block is performed by associating respective ranges of textual portions of said initial common block to each of said plurality of common blocks.

10. The method of claim 1, wherein said step of constructing said merge data structure comprises adapting the range of two or more common blocks in response to said differential information to provide thereby appropriate reference points for delta blocks.

11. The method of claim 1, wherein said merging the N versions comprises iteratively processing each of the plurality of common blocks according to the steps of:
    (a) if the common block is included within each of the N versions, including the common block without conditions in the unified version of source code; and
    (b) if the common block is included within some but not all of the N versions, including the common block with conditions in the unified version of source code.

12. The method of claim 11, wherein iteratively processing each of the plurality of common blocks further comprises:
    (c) if the common block is not included within any of the N versions and is not associated with a delta block, not including the common block in the unified version of source code.

13. The method of claim 11, wherein iteratively processing each of the plurality of common blocks further comprises:

(d) if the common block is not included within any of the N versions and is associated with a delta block included within each of the N versions, including the delta block without conditions in the unified version of source code;

(e) if the common block is not included within any of the N versions and is associated with the delta block included within some but not all of the N versions, including the delta block with conditions in the unified version of source code.

14. The method of claim 11, wherein iteratively processing each of the plurality of common blocks further comprises:

(f) if the common block is included in some but not all of the N versions and is associated with a delta block included within each of the N versions, including the delta block without conditions in the unified version of source code, (g) if the common block is included in some but not all of the N versions and is associated with a delta block included within some but not all of the N versions, including the delta block with conditions in the unified version of source code.

15. A system for performing conditionalized N-way merging of source code, comprising:

memory for storing program components; and a processor for executing the program components, the program components comprising:

a differential collection component for collecting differential information for each of N versions of source code, the source code having lines of text;

a constructor component for constructing a merge data structure using the differential information, the merge data structure comprising a plurality of common blocks and delta blocks, wherein each common block defines a respective sequence of textual lines of source code, each delta block defines an addition or deletion or change to a corresponding common block, each common block and delta block being associated with a respective set of exclusionary definitions indicative of any source code versions not including the respective block; and a merge component for merging the N versions into a single, semantically correct, unified version of source code associated with the program using the merge data structure, the single, semantically correct, unified version of source code associated with the program having preprocessing conditionals adapted to identify differences between the N versions.

16. A non-transitory computer-readable storage medium having instructions stored thereon for performing a method for performing conditionalized N-way merging of source code, the method comprising:

collecting differential information for each of N versions of source code, the source code having lines of text;

constructing a merge data structure using the differential information, the merge data structure comprising a plurality of common blocks and delta blocks, wherein each common block defines a respective sequence of textual lines of source code, each delta block defines an addition or deletion or change to a corresponding common block, each common block and delta block being associated with a respective set of exclusionary definitions indicative of any source code versions not including the respective block; and merging the N versions into a single, semantically correct, unified version of source code associated with the program using the merge data structure, the single, semantically correct, unified version of source code associated with the program having preprocessing conditionals adapted to identify differences between the N versions.

17. A system for performing conditionalized N-way merging of source code, the system comprising:

means for collecting differential information for each of N versions of an original source code program, the original source code program having lines of text;

means for constructing a merge data structure from the differential information; and means for merging the N versions into a single, semantically correct, unified program using the merge data structure, the single, semantically correct, unified program having preprocessing conditionals to represent differences between the N versions.

\* \* \* \* \*